(12) United States Patent
Katz

(10) Patent No.: US 7,502,619 B1
(45) Date of Patent: Mar. 10, 2009

(54) LOCATION DETERMINATION OF LOW POWER WIRELESS DEVICES OVER A WIDE AREA

(76) Inventor: Daniel A. Katz, 87 Tzahal St., Kiryat Ono (IL) 55451

( * ) Notice: Subject to any disclaimer, the term of this patent is extended or adjusted under 35 U.S.C. 154(b) by 0 days.

(21) Appl. No.: 12/017,398

(22) Filed: Jan. 22, 2008

(51) Int. Cl.
| H04W 24/00 | (2006.01) |
| H04M 11/04 | (2006.01) |
| H04B 7/15 | (2006.01) |
| H04B 7/185 | (2006.01) |
| G08B 1/08 | (2006.01) |
| G08B 1/00 | (2006.01) |
| G08B 13/14 | (2006.01) |

(52) U.S. Cl. ............... 455/456.5; 455/404.2; 455/11.1; 455/12.1; 455/13.4; 340/539.15; 340/572.1; 340/539.32; 340/531

(58) Field of Classification Search ............. 455/456.5, 455/456.1, 456.2, 456.3, 456.4, 404.2, 11.1, 455/12.1, 13.1, 13.4; 340/539.15, 572.1, 340/539.32, 539.1, 531, 573.1, 573.3, 573.4, 340/539.13, 539.18
See application file for complete search history.

(56) References Cited

U.S. PATENT DOCUMENTS

| 6,058,374 | A | * | 5/2000 | Guthrie et al. ................ 705/28 |
| 6,091,935 | A | * | 7/2000 | Alexander et al. .......... 455/41.1 |
| 6,657,586 | B2 | | 12/2003 | Turner |
| 7,155,238 | B2 | | 12/2006 | Katz |
| 7,312,752 | B2 | * | 12/2007 | Smith et al. .................. 342/464 |
| 2002/0167919 | A1 | * | 11/2002 | Marples et al. ............. 370/328 |
| 2004/0041707 | A1 | * | 3/2004 | Hull et al. ................ 340/568.1 |
| 2004/0116074 | A1 | * | 6/2004 | Fujii et al. .................. 455/41.2 |
| 2004/0174264 | A1 | * | 9/2004 | Reisman et al. .......... 340/573.4 |
| 2005/0248455 | A1 | * | 11/2005 | Pope et al. ............. 340/539.27 |
| 2006/0158316 | A1 | * | 7/2006 | Eckstein ................... 340/10.42 |
| 2006/0160545 | A1 | * | 7/2006 | Goren et al. ............. 455/456.1 |
| 2006/0202818 | A1 | * | 9/2006 | Greenberg ............. 340/539.13 |
| 2007/0273507 | A1 | * | 11/2007 | Burchell et al. ........ 340/539.27 |
| 2008/0030325 | A1 | * | 2/2008 | Fries ..................... 340/539.32 |
| 2008/0036594 | A1 | * | 2/2008 | Kates ........................ 340/541 |
| 2008/0076450 | A1 | * | 3/2008 | Nanda et al. ............. 455/456.1 |
| 2008/0216765 | A1 | * | 9/2008 | Kates ......................... 119/712 |

* cited by examiner

*Primary Examiner*—George Eng
*Assistant Examiner*—Christopher M Brandt

(57) ABSTRACT

The present invention discloses a method and system for location determination of low power wireless devices, over a wide area, utilizing a multitude of communication devices operating on a WAN (Wide Area Network) which can detect signals transmitted by said nearby low power wireless devices, and report this detection to a control station over the WAN. Said station can further locate the reporting communication device by present art methods such as "network based" or "handset based", and consequently locate the nearby wireless device. Due to the short range nature of the wireless device transmissions, and dynamic mobility of these devices, it is crucial to establish a swift ad-hoc connection between a wireless device and a nearby communication device, still, in order to save battery power and avoid inefficient and interfering transmissions, communications between a wireless device and a communication device are not initiated unitl a sensor comprised in the wireless device detects and a communication device. In a preferred embodiment, the wireless device is Bluetooth and the communication device is a Bluetooth enabled mobile/cellular phone and the sensor detects radiation emitted by the mobile device on non Bluetooth bands.

15 Claims, 3 Drawing Sheets

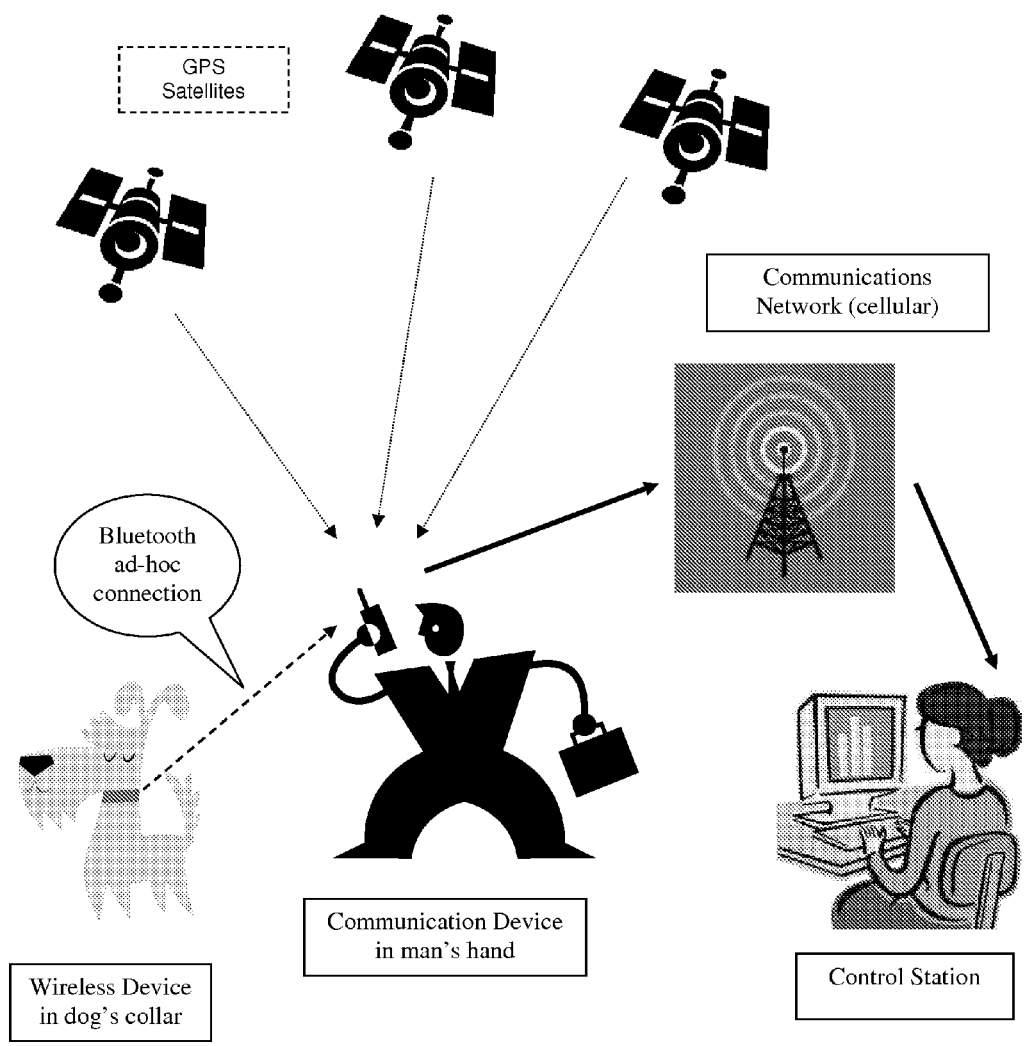
Figure 1 – Illustration of a System for Location Determination of Low Power Wireless Devices over a Wide Area

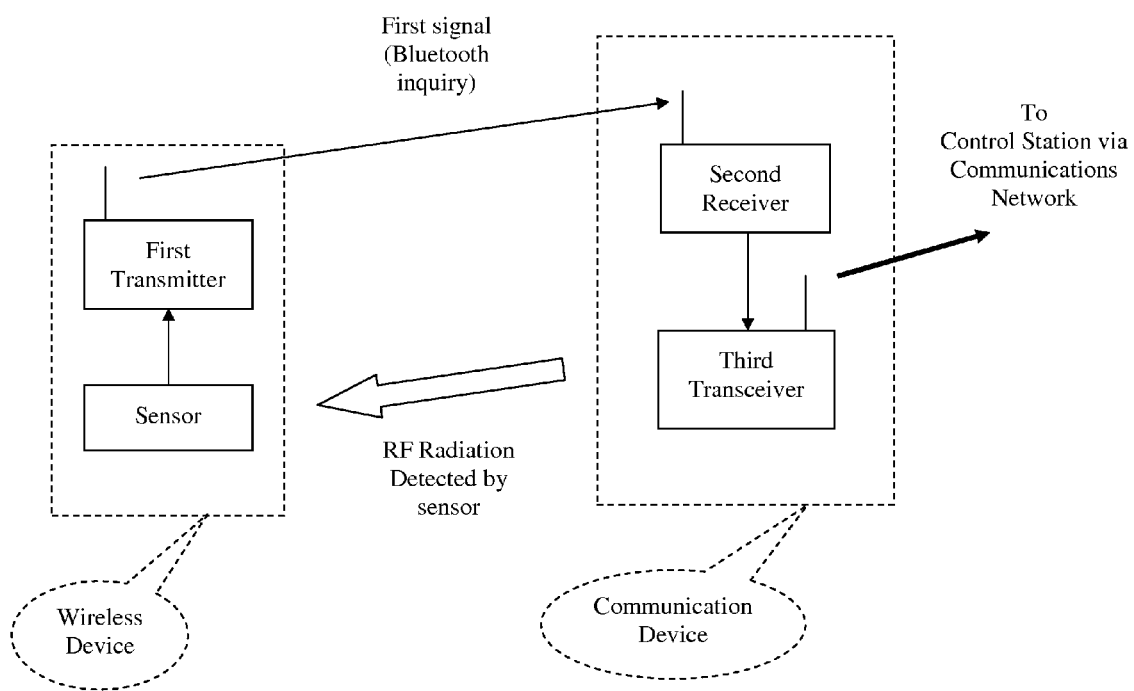
Figure 2 - Block Diagram of a Wireless Device and a Communication Device Figure 3 – Flow Chart of Location Process
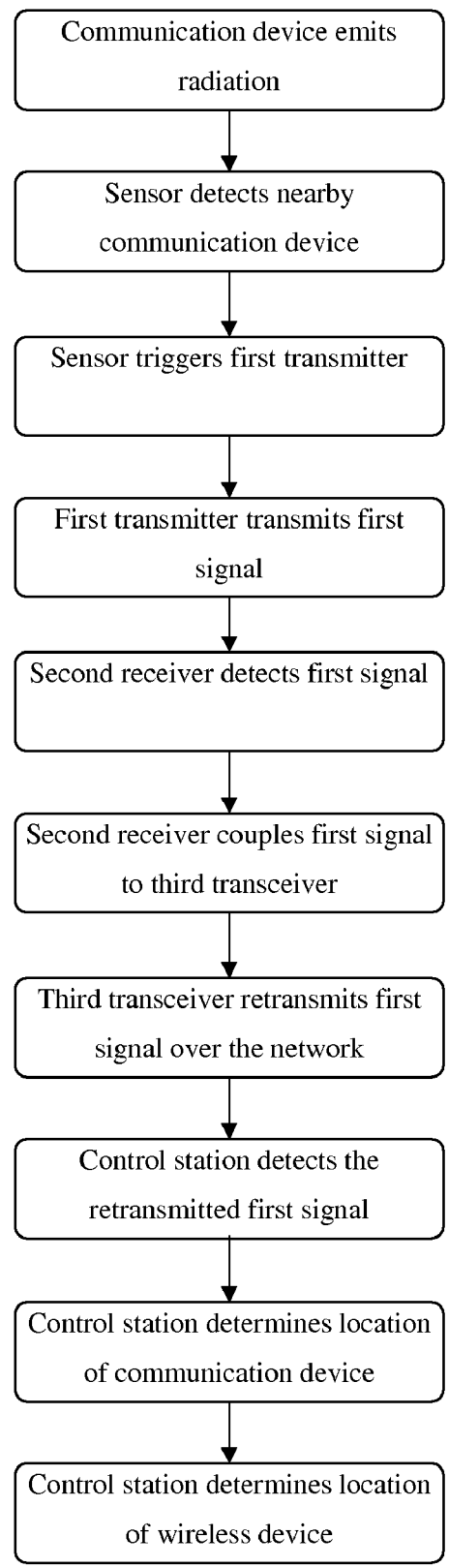

LOCATION DETERMINATION OF LOW POWER WIRELESS DEVICES OVER A WIDE AREA

BACKGROUND OF INVENTION

Location determination of wireless devices is typically employed for locating objects attached with these devices. Such objects may be people, specifically those who might need assistance, animals, pets, vehicles, mobile assets or other valuable items.

The present art provides powerful means for location determination of wireless devices. For example, a mobile (cellular) phone embedded with a GPS (Global Positioning System) receiver can be located practically worldwide. Such a device can be easily carried by a person and operate on a matchbox size battery for several days, before recharged.

However, some applications cannot bear the size or price or limited battery life of such a locatable wireless device. For example, it is not practical to attach a mobile phone to a dog or cat for locating so. Such a locatable device would be probably considered too large and too expensive and too often requiring battery recharge or replacement.

Some prior art inventions suggest a locatable device excluding a wide area transmitter, employing a positioning component such as GPS receiver, coupled with a short range transmitter which can access external devices to display or further communicate the location. Two such inventions are disclosed in the following U.S. patent applications.

U.S. patent application Ser. No. 20030132861 to Shieh discloses a GPS receiver with IR transmitter, adapted to transmit location signals to a nearby device.

U.S. patent application Ser. No. 20080001816 to Wang discloses a portable wireless earphone with a GPS and a Bluetooth wireless module.

Still, comprising a GPS receiver in a locatable device can be too expensive, power consuming, and bulky for some applications. Furthermore, a GPS receiver requires line of sight (LOS) with GPS satellites, thus it's not practical, for example, to place it in a rifle butt, or article in a store, or skier's gear to be tracked upon a snow avalanche.

Other prior art inventions suggest locatable devices excluding built in positioning components, avoiding related costs and power consumption and LOS restrictions. For example, "network based" location methods employed in cellular networks, where a mobile device transmission is detected by typically three base stations, and upon measuring the Time of Arrival (TOA) or Time Difference of Arrival (TDOA) or Angle of Arrival (AOA) of the same signal at these base stations, the mobile device location can be determined.

Still, the wide area transceiver comprised in such mobile devices might be considered too power consuming and too expensive for some applications, such as tracking pets or guns.

Other inventions suggest wirelessly locatable devices which avoid expensive and power consuming positioning components, and also do not use expensive and power consumption transmitters. Some present art technologies such as RFID (Radio Frequency Identification) enable detection and location determination of fingernail size devices that cost some cents, possibly operating many years on a small low cost battery and sometimes even with no battery at all. However, such devices can be read, i.e. located, only a few meters away from a compatible reader.

When an object is to be located in a local area, such as a building or a manufacturing plant or by a traffic toll checkpoint, short range devices might be well used, yet if an object is required to be located over a wide area, e.g. city or country, as in case of a lost dog or stolen car, short range devices are not suitable unless a dense network or readers/antennas/repeaters is deployed, which is often impractical and uneconomical.

Further art was suggested to locate low cost and low power wireless devices, over a wide area, by deploying discrete short range readers which can detect such devices in their vicinity, and report said presence to a remote control station.

U.S. Pat. No. 7,130,646 and U.S. patent application Ser. No. 20040162084 to Wang disclose a method of Positioning with wireless local area networks and WLAN-aided global positioning systems. When associated with a WLAN, a wireless device can quickly determine its relative and/or coordinate position based on information provided by an access point in the WLAN. The WLAN can periodically provide time, location, and decoded GPS data to the wireless device, significantly reducing the time to acquire the necessary GPS satellite data to determine its coordinate position.

Still, Wang's invention employs substantially complex wireless devices, a terrestrial infrastructure, and is actually oriented to assist self location determination at a wireless device rather than determine a wireless device's location at a remote station.

U.S. Pat. No. 6,246,882 to Lachance discloses a system and method for wide area item tracking, attaching an RFID to each item to be tracked. The wide area of the system includes a plurality of handling zones, such as a truck or a manufacturing plant, where items are manipulated or transported during the delivery or shipping process. When the item is moved past a handling zone interrogator into a new handling zone, an RFID reader detects the item ID. A mobile station connected to the RFID reader transmits a signal containing the item ID and an identification of the handling zone over a cellular network, to a remote database.

Lachance's invention enables tracking of low power devices, yet limited to a cellular network cell resolution, and on sporadic regions (warehouse, manufacturing plant, etc') only.

Further inventions suggest adding more accurate positioning facilities to short range readers, so location determination of nearby wireless devices detected by those readers would be refined.

U.S. patent application Ser. No. 20030001775 and U.S. Pat. No. 6,657,586 to Turner disclose a system and method for locating an object, comprised of a plurality of tag readers that receive wireless tag signals from a tag transmitter coupled with an object to be located. Tag signals include ID data, each tag signal reader includes a GPS receiver and a wireless transmitter to transmit tag ID and location of tag reader, to a remote processor, which determines which tag signals are first-to-arrive signals and conducts differentiation of the first-to-arrive signals to locate a tag transmitter and object coupled therewith.

Still, Turner's methods require substantial terrestrial infrastructure, which normally limit the operating area coverage, and generate considerable interrogation transmissions.

Then, in order to cover a wide area for locating low cost and low power wireless devices, without deploying further dense terrestrial infrastructure, mobile access points were been suggested. Such mobile access points could detect short range transmissions from nearby low power wireless devices, and communicate these signals to a remote control station, over a wide area network.

U.S. Pat. No. 7,155,238 to Katz discloses a system and method for location determination of wireless devices based on two layers of communication infrastructure: a fixed network and a mobile network. This invention teaches how a multitude of mobile devices, such as Bluetooth enabled cellular phones, can serve as access points for short range wireless devices, Bluetooth compatible in this example, and communicate their presence to a remote destination. Further, the location of such a short range wireless device can be determined by determining the location of the mobile device which served as its access point, and since this can be well done by present art methods (e.g. mobile device embedded with GPS receiver), the wireless device does not have to obtain built in location determination circuitry and can be substantially small, low cost and low power.

Nevertheless, due to the short range nature of low power wireless devices, and since wireless and mobile devices (including mobile access points) might move dynamically (carried by people, animals vehicles, etc'), it is crucial to establish a swift ad-hoc connection between such devices in order to enable location determination of a wireless device. For example, a mobile device installed in a driving car and a wireless device embedded in a dog's collar, might have a chance to establish a wireless connection for only less than a second, while momentarily staying in communications range, e.g. up to fifty meters apart. In order not to miss this chance, it would be desirable if one of these devices often transmits a searching signal while the other is trying to receive such. However, such as strategy might significantly reduce battery life and cause much noise and interference. On the other hand, putting receivers and transmitters often to sleep as often done for saving battery power, significantly reduces the chance to establish a rapid ad-hoc connection.

In this context, U.S. Pat. No. 7,155,238 does not teach how can an ad-hoc short range connection between a wireless device and a mobile device be rapidly established, while achieving substantial battery life at a wireless device, for example several years of operation on a small low cost battery. This is neither taught by other patents mentioned above.

If a wireless device is required to operate on a small battery for several years, as would be the case with a locatable device attached to a dog or a cat or a gun, then power consumption should be carefully considered, normally causing the device to stay most to the time asleep, i.e. in deep power save mode. For example, a typical lithium battery of size ½ AA (cylinder shape, about 14 mm base diameter and 25 mm height) and nominal voltage of 3.6 V, obtains a capacity of about 1 Ah, thus enables 5 years of operation at an average current consumption of about 23 micro amperes (0.023 milliamps). But even a low power receiver such as Bluetooth (reference—www.csr.com) consumes at least several milliamps when active, and more than 0.5 milliamps in inquiry/inquiry scan modes, searching for ad-hoc connections (further information on Bluetooth can be found at www.bluetooth.com and http://en.wikipedia.org/wiki/Bluetooth). Even "conditional scan" mode, searching for RF activity on Bluetooth bands, requires much more power from the scanning device and obviously additional power is consumed and dissipated by the inquiring transmitter until an ad-hoc connection is accomplished. Furthermore, inquiry and inquiry scan operations might last a long time until succeed, due to uncertainties in space (out of range) and time (unsynchronized clocks) and frequencies (different hopping patterns) and mode (which device inquires and which one is scanning for inquiry), between two unconnected Bluetooth devices. During these long periods, batteries are wasted and interfering signals are generated, undesirably.

Specifically, the process of establishing a wireless connection between unsynchronized frequency hopping devices is not straight forward. The following paper, for example, studies ad hoc networking with Bluetooth, to find an efficient way of discovering neighbor devices. Based on real-world measurements and simulations, the researches derive optimal parameters for symmetric ad hoc neighbor discovery, using standard Bluetooth procedures (inquiry and inquiry scan). The results show a mean neighbor discovery delay of about 8 seconds. Clearly, such a long discovery time is undesirable for devices installed in driving cars or so, and as indicated before, this period of time can become even longer when such devices move away and often go to sleep in order to save battery power.

Paper: Performance of Symmetric Neighbor Discovery in Bluetooth Ad Hoc Networks

Diego Bohman, Matthias Frank, Peter Martini, Christoph Scholz

Institute of Computer Science IV, University of Bonn, Romerstraβe 164, D-53117 Bonn http://web.informatik.uni-bonn.de/IV/Mitarbeiter/scholz/10Bohman.pdf The following invention suggests a location method with fast detection of moving wireless devices, enabling significant power consumption saving.

U.S. Pat. No. 4,649,385 to Aires et al. discloses a method for determining the location of a transceiver unit throughout a defined facility. A central station establishes communications with one or more relay stations, searching for a particular unit over that area, the relay stations respond by sending out wake-up signals and radiant energy inquiry signals. The individual unit identified in the inquiry signal responds with a radiant energy acknowledgement signal. Embodiments of the invention disclose the use of infrared energy or ultrasonic energy for the radiant energy. The relay stations report to the central station whether the individual unit acknowledged the searching signal.

Aires' method enables location determination of low power devices, yet it requires a significant terrestrial infrastructure and would be typically restricted to local areas such as a hospital, an airport, a department store, a large legal office, a manufacturing complex, etc', but is not practical for wide area (e.g. city, country) location determination. In addition, similarly to RFID methods, detection range is quite limited due to the nature of wireless communications employed. Furthermore, much inefficient radiation is emitted by the relay station/interrogator/reader, since it has no prior knowledge indicating a potential presence of a nearby wireless device, therefore constantly transmitting interrogation signals.

The present are methods described above have not yet provided satisfactory solutions to the problem of location determination of low power wireless devices over a wide area.

It is an object of the present invention to provide a system and method for location determination of wireless devices over a wide area.

It is another object of the present invention to provide a system and method for location determination of wireless devices over a wide area, enabling low power consumption devices.

It is also an object of the present invention to provide a system and method for location determination of wireless devices over a wide area, enabling low cost devices.

It is yet another object of the present invention to provide a system and method for location determination of wireless devices over a wide area, enabling small and lightweight devices.

It is also an object of the present invention to provide a system and a method for location determination of wireless devices over a wide area, by leveraging present accurate location determination systems such as GPS and cellular network based methods.

It is still another object of the present invention to provide a system and method for location determination of wireless devices over a wide area, minimizing deployment of further communications networking infrastructure.

It is yet another object of the present invention to provide a system and method for location determination of wireless devices over a wide area, avoiding as much as possible inefficient transmissions which cause interference and jamming and noise.

Other objects and advantages of the invention will become apparent as the description proceeds.

SUMMARY OF INVENTION

The invention is directed to a system and method for location determination of wireless devices, over a wide area, comprised of:
a) a plurality of wireless devices, each wireless device comprised of a first short range transmitter and a sensor;
b) a plurality of communication devices, each communication device comprised of a second receiver and a third transceiver;
c) a communications network;
d) a control station coupled to said network;
wherein said sensor is configured to detect a nearby communication device by radiation which does not communicate data to said wireless device and consequently trigger said first transmitter to transmit a first signal, said second receiver configured to detect said first signal and couple it to said third transceiver, said third transceiver configured to communicate said signal to said control station through said communications network, and said control station configured to determine the location of said communication device, and consequently determine the location of said nearby wireless device.

The wireless device location is then determined by the control station as the location of the communication device which communicated the presence of this nearby wireless device.

In a preferred embodiment, said sensor is tuned to detect radiation emitted by said third transceiver. Such radiation may be emitted by the receiver part or/and the transmitter part of said third transceiver. Obviously, the transmitter's radiation is stronger, however intermittently emitted (either triggered by a user, or automatically activated by the system, e.g. periodic beacon signal), while the receiver's radiation, typically emitted by its local oscillator, is relatively weak, however continuous.

Yet, in another embodiment, communication devices further comprise a fourth emitter, and the wireless device's sensor is configured to detect said fourth emitter's radiation. This radiation can be on RF bands, e.g. microwaves, or any other part of the electromagnetic spectrum, e.g. visible or infra red light, also sound and ultrasonic waves, etc'. Actually, this fourth emitter can "wake-up" nearby wireless devices by emitting any type of radiation/energy detectable by said sensor, such as vibration, high/low temperature, humidity, air pressure, specific chemical compound or property, etc'. This way, a low power and low cost and small sensor can be employed. For example, in an embodiment related to a system for locating dogs, communication devices may emit sounds/smells which attract dogs and also detectable by a sensor which is installed in a wireless device embedded in the dog's collar.

As a person skilled in the art may appreciate, the first signal is basically indicating the presence of a wireless device. For some applications it is good enough to know that a wireless device, even any wireless device which is part of this system, is present in a specific location. A non limiting example of such a strategy is a system that monitors traffic congestion statistics. Other applications might require identification of wireless devices to a sub group resolution. A non limiting example of such approach is a system that monitors the location of animals, distinguishing different species. Many other applications would require identification of a specific object, e.g. individual person, i.e. a specific wireless device. In a preferred embodiment, a wireless device further comprises memory component(s) storing identification data and said first transmitter is configured to transmit said data embedded in first signal. This obviously enables all above mentioned cases of identification. In this context, several communication standards define a unique ID allocated to each individual wireless device, which may be employed for the purpose of the present invention. Some non limiting examples are: Bluetooth, Ethernet, WiFi (MAC address), IP (Internet Protocol), RFID, etc'.

As a person skilled in the art may appreciate, the first signal may be comprised of several packets of data, identical or different in content, transmitted one after the other, with or without a time gap between the end of a packet and the start of the next packet.

Further to location determination, the present invention enables remote monitoring of the status by the wireless device, such as temperature, humidity, acceleration, electromagnetic radiation, chemical properties, physiological parameters, and similarly, by adding or coupling to the wireless device circuitry configured to monitor the present and/or past such status, and communicating these status data to said control station through said nearby communication device.

Communication devices may be mobile and/or fixed. Fixed devices may be installed, for example, in "hot spots", such as airport lounges, coffee shops, restaurants and even private premises, usually providing Internet access. Mobile communication devices may be, as in the preferred embodiment, personal communication devices such as cellular phones.

The location of said communication device can be determined either by the communications network, or by the communication device or by a combination thereof. "Network based" location determination methods, such as TOA (Time of Arrival) or TDOA (Time Difference of Arrival) or AOA (Angle of Arrival) are well practiced in the present art. "Handset based" (i.e. "communication device based", in the context of the present invention) are also well-known in the present art, particularly those based on embedded GPA (US Global Positioning System) receivers, or other types of GNSS (Global Navigation Satellite System) such as Galileo (the European system) or GLONASS (the Russian system).

In a preferred embodiment, said communications network is a cellular network (such as GSM or TDMA or CDMA or WiMax, etc') and said communication device is a compatible mobile (cellular) phone or any other type of personal communication device. Further, the communication device comprises an additional short range wireless transceiver, which is preferably Bluetooth/IEEE 802.15 compatible, yet alternatively may be WLAN, WiFi/IEEE 801.11, ZigBee, UWB, wireless USB, Infra-Red, RFID, etc', preferably unlicensed.

As indicated, in the preferred embodiment, the short range link between a wireless device and a communication device is Bluetooth compatible, then, preferably, the wireless device first signal transmitted upon detecting a nearby communication device is a Bluetooth inquiry message. As appreciated by a person skilled in the art, an inquiry message is transmitted by a Bluetooth device searching for new neighboring devices, trying to establish an ad-hoc connection. A communication device is then preferably configured to scan for inquiry messages, to enable a swift detection of a nearby Bluetooth wireless device.

The invention is also directed to a wireless device for a system for location determination of wireless devices, over a wide area, said system comprised of a plurality of wireless devices, a plurality of communication devices, a communication network and a control station coupled to said network, wherein said wireless device comprised of a first short range transmitter and a sensor, said sensor configured to detect a nearby communication device and consequently trigger said first transmitter to transmit a first signal, said communication device comprises of a second receiver and a third transceiver, said second receiver configured to detect said first signal and couple it to said third transceiver, said third transceiver configured to communicate said signal to said control station through said communications network, said control station configured to determine the location of said communication device, and consequently determine the location of said nearby wireless device, wherein said senor is configured to detect radiation which does not communicate data to said wireless device.

The invention is further directed to a communication device for a system for location determination of wireless devices, over a wide area, said system comprised of a plurality of wireless devices, a plurality of communication devices, a communications network and a control station coupled to said network, wherein each of said wireless devices comprised of a first short range transmitter and a sensor, said sensor configured to detect a nearby communication device and consequently trigger said first transmitter to transmit a first signal, said communication device comprised of a second receiver and a third transceiver, said second receiver configured to detect said first signal and couple it to said third transceiver, said third transceiver configured to communicate said signal to said control station through said communications network, said control station configured to determine the location of said communication device, and consequently determine the location of said nearby wireless device, wherein said sensor is configured to detect radiation which does not communicate data to said wireless device.

Other objects and advantages of the invention will become apparent as the description proceeds.

BRIEF DESCRIPTION OF DRAWINGS

The above and other characteristics and advantages of the invention will be better understood through the following illustrative and non-limitative detailed description of preferred embodiments thereof, with reference to the appended drawings, wherein:

FIG. 1 illustrates a System for Location Determination of Low Power Wireless Devices over a Wide Area. The figure depicts a communication device carried by a person, a wireless device embedded in a dog's collar, an illustration of a communication network and a control station (operator by computer terminal) coupled to that network. In addition, three GPS satellites are shown, which signals are detected by a GPS receiver (not shown) embedded in the communication device. Full or dotted lines illustrate wirelessly transmitted signals: a) from GPS satellites, detected by the communication device; b) from the wireless device, detected by the communication device; c) from the communication device, through the network, to the control station.

FIG. 2 illustrates a Block Diagram of a Wireless Device and a Communication Device according to the present invention. The wireless device block depicts a senor and a first transmitter; the communication device block depicts a second receiver and a third transceiver. Arrows and lines illustrate wireless signals: a) RF radiation emitted by the communication device and detected by the wireless device's sensor; b) A short range transmission (first signal) from the wireless device detected by the second receiver at the communication device; c) Third transceiver's transmission to the communications network with destination to the control station. A preferred embodiment of the communication device comprises also a GPS receiver (not shown), but other embodiments do not necessarily require it.

FIG. 3 depicts a Flow Chart of the Location Process, according to the present invention, step by step.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The invention is directed to a system and method for location determination of wireless devices, over a wide area, comprised of: a) a plurality of wireless devices, each wireless device comprised of a first short range transmitter and a sensor; b) a plurality of communication devices, each communication device comprised of a second receiver and a third transceiver; c) a communications network; d) a control station coupled to said network; wherein said sensor configured to detect a nearby communication device and consequently trigger said first transmitter to transmit a first signal, said second receiver configured to detect said first signal and couple it to said third transceiver, said third transceiver configured to communicate said signal to said control station through said communications network, said control station configured to determine the location of said communication device, and consequently determine the location of said network wireless device, wherein said sensor is configured to detect radiation which does not communicate data to said wireless device.

The wireless device location is then determined by the control station as the location of the communication device which communicated the presence of this nearby wireless device, and possibly further refined by additional data (e.g. first signal strength as received by second receiver).

This way, of course, location of valuable objects/items attached with such a wireless device can be determined. Some non limiting examples for such locatable objects are: people, specifically those who might need assistance, animals, pets, vehicles, weapons, ammunition, mobile assets or other valuable items.

A system according to a preferred embodiment of the present invention, for location determination of lost dogs, is illustrated in FIG. 1. The figure depicts: a) a communication device—Bluetooth enabled mobile phones with built in GPS receiver (not shown), carried by a pedestrian; b) a wireless device—Bluetooth radio embedded in a dog's collar; c) a communications network—cellular network; and d) a control station—web server computer (operator by a client computer) coupled to that network.

Further, FIG. 2 shows a block diagram of a wireless device and a communication device according to the present invention. The wireless device comprises a sensor and a first transmitter which is preferably a Bluetooth integrated radio chip, based on CSR's BlueCore IC family; a reference specification can be read here—http://www.csr.com/products/bc6rom spec.htm. Additionally, an application program can be installed in the radio chip memory, configured to administer the tasks required by the present invention. These tasks are basically detailed in the flow chart depicted in FIG. 3, among others, as one skilled in the art may appreciate.

Still referring to FIG. 2, the communication device comprises a Bluetooth radio (second receiver) compatible to the first transmitter, and a third transceiver which is a cellular radio modem. In the preferred embodiment, the communication device comprises also a GPS receiver (not shown in FIG. 2). Such communication device can be implemented by an off the shelf mobile phone since several mobile phones in the market integrate a Bluetooth radio and a GPS receiver, such as Nokia N82, Nokia N95, Nokia N810, Motorola i580, Motorola i876 or Motorola i880. The additional functionality required at the communication device according to the present invention, may be implemented in s/w. A non limiting example for such s/w is a JAVA application (midlet) installed in a MIDP1-2 (JAVA-Mobile Information Device Profile) mobile device, which implements the relevant tasks detailed in the flow chart depicted in FIG. 3, as one skilled in the art may appreciate.

The sensor, in the preferred embodiment, is an RF detector tuned to detect RF radiation emitted by the cellular radio comprised in each communication device. Normally, such radiation is emitted during an active call, either inbound or outbound, and also when not necessarily attended, due to automatic system procedures. The latter usually includes a frequency beacon signal transmitted at intervals adjustable by the network operator, in order to synchronize between the end device and the cellular network. In the context of the present invention, adjusting the cellular phone to more frequent systems transmissions is desirable, since it increases the probability for successful proximity detection between a wireless device and a communication device. Since different cellular networks might employ different standard frequency band, such as 800 MHz, 850 MHz, 900 MHz, 1800 MHz, 1900 MHz, 2100 MHz, etc', the sensor should be tuned to the proper network frequency band, as one skilled in the art may appreciate. One simple embodiment of an RF detector is an RF antenna coupled to a band pass filter, possibly made of passive components, such an an R-L-C circuit, with a natural frequency equals to $1/[2*\pi*SQRT(L*C)]$ and band/width equals to $R/(2*\pi*L)$. The output of this circuit can be further coupled to a low power amplifier. Such resonant circuits are well practiced in the art, active as well as passive. Further explanations may be found through the following links—http://en.wikipedia.org/wiki/RLC circuit; http://en.wikipedia.org/wiki/Bandpass filter. Other non limiting examples and descriptions of cellular RF detectors can be found in U.S. Pat. No. 6,934,515 to Wallach, disclosing an electromagnetic radiation alerting device for use with a cellular telephone.

In the preferred embodiment, the sensor output signal is configured to turn on the first transmitter, to send discrete consecutive inquiry messages (i.e. first signals), for a pre-defined period of time, e.g. 5 minutes. Meanwhile, the second receiver comprised in the communication device is configured to scan for inquiry messages (preferably constantly), so when said wireless device and said communication device get close enough to each other, there is a fair chance that at least one of said inquiry messages transmitted by the wireless device will be detected by the communication device. Further, first transmitter which is preferably a Bluetooth radio, obtains a unique Bluetooth ID stored in a non volatile memory integrated in the Bluetooth chip, and since a Bluetooth inquiry message reflects the transmitter's ID (to a substantially practical resolution), the wireless device's ID (equivalent to the Bluetooth device ID) can be determined by the second receiver, upon detecting its inquiry message. Then, this ID, which is communicated in said first signal, is further communicated to said third transceiver, i.e. the cellular radio, and then transmitted to the control station, over the cellular network, along with the communication device's self location coordinates, derived from the built in GPS receiver. When this message arrives to the control station, indicating a wireless device ID and the location coordinates of a nearby communication device, it is straight forward for the control station to determine the location of this specific wireless device, as it is assumed to be substantially near to the known location of the reporting communication device.

In this preferred embodiment, the first signal is comprised of at least one message, but maybe more, with a proper time gap between consecutive messages, sequentially been sent until a message is been acknowledged or a time out is achieved. Each of these messages contains the transmitter's ID and a similar payload, as well practiced in Bluetooth communications.

In another embodiment, the communication device does not obtain a built in GPS receiver, and its location is determined by the cellular network, in a "network based" method, such as TOA (Time of Arrival) or TDOA (Time Difference of Arrival) or AOA (Angle of Arrival). This will usually require the cooperation of the cellular operator.

In a second embodiment of the present invention, the communications network is the worldwide web, i.e. the Internet, and communication devices are WiFi/IEEE 802.11 access points ("hot spots") coupled to the Internet. Then, the first transmitter comprised in the wireless device is also WiFi, as well as the second receiver comprised in each access point, while the third transceiver comprised in each access point is a wireline transceiver, e.g. ADSL, employing TCP/IP over Ethernet (MAC) protocols, as well practiced in the art. The control station is a web server, communicating with said access points on a secure TCP/IP protocol. As a person skilled in the art may appreciate, the MAC address of said first transmitter might well serve as the wireless device's ID. Also, since WiFi access points frequently transmit beacon frames, typically at 100 ms intervals, wireless devices preferably comprise a sensor configured to detect these broadcast beacons. Such a sensor is preferably not a Frequency Hopping (FH) receiver, but a simple RF detector tuned to detect an RF carrier, not baseband data (no demodulator), on a pre-defined channel employed by the access point for beaconing. According to this second embodiment, the WiFi radio comprised in each wireless device is kept in deep power save mode, possibly turned completely off, enabling a great degree of power saving, until the integrated senor detects a beacon signal broadcast by an access point, i.e. detects RF energy on a pre-defined frequency band and above a predefined threshold of power, as a person skilled in the art would probably appreciate. Then, as the present invention teaches, the sensor triggers the first transmitter to transmit a first signal, according to the WiFi/IEEE 802.11 standard. In this second embodiment, the wireless device uses the nearby access point to send a TCP/IP message over the Internet, destined to the control station. Since in this second embodiment communication devices are fixed, then the control station is configured in advance with their location coordinates. Consequently, when a message arrives to the control station, indicating a wireless device ID (e.g. its MAC address, or IP static address), and since the location coordinates of the access point that routed this message are known in advance, it is straight forward to the control station to determine the location of this specific wireless device, as it is assumed to be substantially near to the known location of that access point.

In another embodiment, communication devices further comprise a fourth emitter, and the wireless device's sensor is configured to detect said fourth emitter's radiation. This radiation can be on RF bands, e.g. microwaves, or any other part of the electromagnetic spectrum, e.g. visible or infra red light, also sound and ultrasonic waves, etc'.

Also, other embodiments of the short range link between a wireless device and a communication device, established by first transmitter and second receiver, are not limited to Bluetooth/IEEE 802.15 and WiFi/IEEE 802.11, yet may comply with other unlicensed wireless communication standards such as ZigBee, UWB, wireless USB, Infra-Red, RFID, etc'.

Further embodiments may additionally employ remote monitoring of the status by the wireless device, which is typically relevant to the attached locatable object, by adding or coupling to the wireless device circuitry configured to monitor present and/or past status, and communicating these status data to said control station through said nearby communication device. For example, a radioactivity sensor can be added to radioactive locatable items, temperature and humidity sensors can be added to valuable pieces of art, illness/health or any physiological monitoring components added to persons or animals or pets, acceleration sensor attached to ammunition, etc'.

According to one aspect of the current invention, a system for locating containers is deployed worldwide. Each container is attached with a wireless device, with an IEEE 802.11 compatible radio (first transmitter), while IEEE 802.11 compatible access points—APs (second receiver of communication device) are deployed in ports, container hubs, depots, ships, trucks, etc', each AP coupled to a satellite communication (SATCOM) network by a built in SATCOM modem (third transceiver), also a control station computer coupled to same network. Further, each AP comprises a GPS receiver, and each wireless device comprises an RF sensor. The sensor is a simple circuit configured to detect RF energy in the 2.40-2.48 GHz band, however not configured to detect baseband data or perform frequency hopping. When a container gets near to such an AP, in a harbor, or depot or on a truck and similarly, a location determination process is performed, unless already done on the same day (as a non limiting example). During this process, the sensor detects RF energy emitted by that nearby AP, possibly related to the routine beacon messages frequently broadcast by each AP, and consequently turns on the wireless device's WiFi radio, which immediately starts transmitting messages searching for an AP. Upon establishing a connection between the wireless device and the nearby AP, the wireless device sends a message to the control station, through that AP and through the SAT-COM network. Further, the control station interrogates the relevant AP for its position, which is automatically determined by the GPS receiver comprised in each AP. Having the wireless device's ID, which is the MAC address of the built in IEEE 802.11 radio (also serving as the container's ID for the purposes of this system) and obtaining the location coordinates of the AP, the control station can easily determine the location of that container.

According to another aspect of the invention, a system for location determination of personnel in danger is deployed in a large nuclear plant. Each person is attached with a tag (wireless device) comprised of a short range transmitter (first transmitter) and a radioactivity sensor. The plant obtains several spots, mapped in advance, which might be dangerous for personnel exposed to excessive nuclear radiation there. Thus, at each of such spots, a communication device is installed, configured to relay a transmission from said first transmitter to a control station in the plant headquarters. This communication device implements said retransmission process by a second receiver compatible to said first transmitter, and a third transceiver which is a high power VHF/UHF radio modem, capable of been received at the control station. Upon sensing an excessive nuclear radiation, the tag's sensor activates the first transmitter to transmit sequential distress signals (first signal), for a pre-defined period of time (5 minutes, as a non limiting example), which modulate the specific employee ID, which is stored in the tag. These signals are relayed to the control station, additionally indicating which specific communication device is retransmitting those signals, so the control station which already mapped the plant, can determine which person is in danger and where, and assist him accordingly.

According to one more aspect of the present invention, a system for locating lost dogs is deployed in a wide area, operated by volunteers or for business purposes or by law. Each dog's collar is embedded with a wireless device comprised of a Bluetooth radio (first transmitter) and an ultrasonic sensor. Bluetooth "hot spots" (communication devices) are deployed all over the area, serving as Bluetooth access points to the Internet, each comprised of a Bluetooth radio (second receiver), an ADSL or CATV modem (third transceiver) and an ultrasonic transmitter (fourth emitter). This fourth emitter transmits low power ultrasonic signals, configured to be sensed by dogs but not by humans. Furthermore, these ultrasonic signals are configured to attract dogs, perhaps regarded as radio broadcast stations for dogs, as a dog skilled in the art would appreciate. A web server (control station) administers the system, obtaining in advance the exact location coordinates of every hot spot which is part of the system. So, when a dog is close enough to a hot spot, its sensor detects the ultrasonic signals, turns on the embedded Bluetooth radio and establishes an ad-hoc connection with the hot spot. Further, a message is transmitted from the wireless device to the control station, through the hot spot and over the Internet, which identifies that specific wireless device (i.e. specific dog). Then, as a person skilled in the art might guess, the control station can easily determine the location of the dog, and contact the dog owners/keepers, as registered in the control station's data base.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A system for location determination of wireless devices, over a wide area, comprised of a plurality of wireless devices, a plurality of communication devices, a communication network and a control station coupled to said network, wherein each of said wireless devices comprised of a first short range transmitter and a sensor, but not a receiver, said sensor configured to detect a nearby communication device and consequently trigger said first transmitter to transmit a first signal, said communication device comprised of a second receiver and a third transceiver, said second receiver configured to detect said first signal and couple it to said third transceiver, said third transceiver configured to communicate said signal to said control station through said communication network, said control station configured to determine the location of said communication device, and consequently determine the location of said nearby wireless device, wherein said sensor is configured to detect the nearby communication device by detecting radiation emitted by one of said communication devices communicating with another of said communication devices.

2. A system according to claim 1, wherein said sensor is tuned to detect radiation emitted by either one of: the receiver part of said third transceiver: the transmitter part of said third transceiver; the receiver and the transmitter parts of said third transceiver.

3. A system according to claim 1, wherein said communication device further comprises a fourth emitter, wherein said sensor is configured to detect said fourth emitter's radiation.

4. A system according to claim 1, wherein said wireless device further comprises memory component(s) storing identification data and said first signal communicates said identification data.

5. A system according to claim 1, wherein said communication devices are either mobile or fixed or a combination thereof.

6. A system according to claim 1, wherein the location of said communication device is determined either by the communications network or by the communication device or by a combination thereof.

7. A system according to claim 1, wherein said communication device further comprises a receiver configured to determine self location according to a Global Navigation Satellite System (GNSS), or a Satellite Navigation System (SNS), or a Satellite Positioning System (SPS), or a Global Positioning System (GPS).

8. A system according to claim 1, wherein said communication device is a mobile/cellular personal communication device, or/and a mobile phone or a PDA.

9. A system according to claim 1, wherein said first transmitter and said second receiver employ unlicensed wireless data communications, according to one or more of: Bluetooth, IEEE 802.15, WLAN, WiFi, IEEE 802.11, ZigBee, UWB, wireless USB, Infra-Red.

10. A system according to claim 1, wherein said sensor is configured to trigger said first transmitter upon detecting radiation/energy of one or more of the following nature: RF, visible/infra red light, electromagnetic radiation, sound and ultrasonic waves.

11. A system according to claim 1, wherein said first signal is a Bluetooth inquiry message and said second receiver is configured to periodically scan for Bluetooth inquiry messages.

12. A system according to claim 1, wherein said wireless device is attached to an object to be located, from the following list: person, animal, pet, vehicle, weapon, ammunition, valuable asset.

13. A system according to claim 1, wherein said wireless device comprises further circuitry or linked to external components configured to monitor the present and/or past status in the vicinity of said wireless device, according to at least one of the following parameters: temperature, humidity, acceleration, electromagnetic radiation, chemical properties, physiological parameters, and wherein said status data is communicated to the control station through a nearby communication device.

14. A wireless device for a system for location determination of wireless devices, over a wide area, said system comprised of a plurality of wireless device, a plurality of communication devices, a communication network and a control station coupled to said network, wherein said wireless device comprised of a first short range transmitter and a sensor, but not a receiver, said sensor configured to detect a nearby communication device and consequently trigger said first transmitter to transmit a first signal, said communication device comprised of a second receiver and a third transceiver, said second receiver configured to detect said first signal and couple it to said third transceiver, said third transceiver configured to communicate said signal to said control station through said communications network, wherein said sensor is configured to detect the nearby communication device by detecting radiation emitted by one of said communication devices communicating with another of said communication devices.

15. A method for location determination of wireless devices, over a wide area, wherein each wireless device obtaining a short range transmitter and a sensor, but not a receiver, comprising the steps of:
   a) detecting at the wireless device the presence of a nearby communication device by means of said sensor wherein said sensor is configured to detect the nearby communication device by detecting radiation emitted by one of said communication devices communicating with another of said communication devices;
   b) transmitting a first signal from the wireless device by means of said short range transmitter;
   c) detecting said first signal at a nearby communication device;
   d) communicating part or all the information detected at the communication device to a control station, over a communication network; and
   e) determining the location of the communication device, and consequently the location of the nearby wireless device, by said control station.

* * * * *